United States Patent
Gavalda et al.

(10) Patent No.: US 7,725,318 B2
(45) Date of Patent: May 25, 2010

(54) SYSTEM AND METHOD FOR IMPROVING THE ACCURACY OF AUDIO SEARCHING

(75) Inventors: Marsal Gavalda, Atlanta, GA (US); Moshe Wasserblat, Modiin (IL)

(73) Assignee: NICE Systems Inc., Rutherford, NJ (US)

( * ) Notice: Subject to any disclaimer, the term of this patent is extended or adjusted under 35 U.S.C. 154(b) by 788 days.

(21) Appl. No.: 11/195,144

(22) Filed: Aug. 1, 2005

(65) Prior Publication Data

US 2006/0074898 A1    Apr. 6, 2006

Related U.S. Application Data

(60) Provisional application No. 60/592,125, filed on Jul. 30, 2004.

(51) Int. Cl.
*G10L 15/04* (2006.01)
*G10L 15/00* (2006.01)

(52) U.S. Cl. .................. 704/251; 704/245; 704/257; 707/3

(58) Field of Classification Search .......... 704/246, 704/251, 243, 245, 253, 256, 256.2
See application file for complete search history.

(56) References Cited

U.S. PATENT DOCUMENTS

| | | | | |
|---|---|---|---|---|
| 4,783,803 A | * | 11/1988 | Baker et al. | 704/252 |
| 5,056,150 A | * | 10/1991 | Yu et al. | 704/248 |
| 5,646,839 A | * | 7/1997 | Katz | 379/142.11 |
| 6,073,095 A | * | 6/2000 | Dharanipragada et al. | 704/242 |
| 6,212,500 B1 | * | 4/2001 | Kohler | 704/256 |
| 6,272,463 B1 | * | 8/2001 | Lapere | 704/248 |
| 6,389,392 B1 | * | 5/2002 | Pawlewski et al. | 704/241 |
| 6,393,398 B1 | * | 5/2002 | Imai et al. | 704/254 |
| 6,434,520 B1 | * | 8/2002 | Kanevsky et al. | 704/243 |
| 6,513,005 B1 | * | 1/2003 | Qin et al. | 704/254 |
| 6,738,745 B1 | * | 5/2004 | Navratil et al. | 704/277 |
| 6,850,885 B2 | * | 2/2005 | Raddino et al. | 704/236 |
| 6,976,019 B2 | | 12/2005 | Davallou et al. | |
| 7,139,714 B2 | * | 11/2006 | Bennett et al. | 704/270.1 |
| 7,171,360 B2 | * | 1/2007 | Huang et al. | 704/245 |
| 7,231,351 B1 | * | 6/2007 | Griggs | 704/251 |
| 7,263,484 B1 | * | 8/2007 | Cardillo et al. | 704/236 |

(Continued)

OTHER PUBLICATIONS

P.S. Cardillo, M. Clements, and M.S. Miller. Phonetic searching vs. LVCSR: How to find what you really want in audio archives. International Journal of Speech Technology, 5:9{22, 2002.*

(Continued)

*Primary Examiner*—Talivaldis Ivars Smits
*Assistant Examiner*—Greg A Borsetti
(74) *Attorney, Agent, or Firm*—Pearl Cohen Zedek Latzer, LLP (57) ABSTRACT

A system and method for improving the accuracy of audio searching using multiple models to process an audio file or stream to obtain search tracks. The search tracks are processed to locate at least one search term and generate multiple search results. The number of search results is equivalent to the number of models used to process the audio stream. The search results are combined to generate a unified search result. The multiple models may represent different languages, dialects and accents.

16 Claims, 7 Drawing Sheets

U.S. PATENT DOCUMENTS

| | | | | |
|---|---|---|---|---|
| 7,401,019 | B2* | 7/2008 | Seide et al. | 704/254 |
| 2002/0013706 | A1* | 1/2002 | Profio | 704/254 |
| 2002/0052870 | A1* | 5/2002 | Charlesworth et al. | 707/3 |
| 2003/0018475 | A1* | 1/2003 | Basu et al. | 704/270 |
| 2003/0088397 | A1* | 5/2003 | Karas et al. | 704/1 |
| 2003/0177108 | A1* | 9/2003 | Charlesworth et al. | 707/1 |
| 2004/0024599 | A1* | 2/2004 | Deisher | 704/256 |
| 2004/0083099 | A1* | 4/2004 | Scarano et al. | 704/231 |
| 2004/0117185 | A1* | 6/2004 | Scarano et al. | 704/254 |
| 2005/0055205 | A1* | 3/2005 | Jersak et al. | 704/233 |
| 2006/0206324 | A1* | 9/2006 | Skilling et al. | 704/231 |

OTHER PUBLICATIONS

J. R. Rohlicek, P. Jeanrenaud, K. Ng H. Gish, B. Musicus, and M. Siu. Phonetic training and language modeling for word spotting. In Proc. of International Conference on Audio, Speech and Signal Processing, pp. 459{462, 1993.*

Clements, M., Cardillo, P., and Miller,M. (2001). Phonetic searching of digital audio. Broadcast Engineering Conference Proceedings. Washington: National Association of Broadcasters, pp. 131-140.*

Kim, J. et al, "A Keyword Spotting Approach based on Pseudo N-gram Language Model", 9th Conf. on Speech and Computer (SPECOM 2004), Patras, Greece, 2004.*

Cardillo et al., 2002 P. Cardillo, M. Clements and M. Miller, Phonetic searching vs. LVCSR: how to find what you really want in audio archives, Internat. J. Speech Technol. 5 (2002), pp. 9-22.*

Clements, M., Cardillo, P., and Miller, M. (2001). Phonetic searching of digital audio. Broadcast Engineering Conference Proceedings. Washington: National Association of Broadcasters, pp. 131-140.*

Deborah Rekm Marc Zissman, Terry Gleason and Beth Losiewicz. Automatic-dialect identification of extemporaneous conversational latin american spanish speech. Proc. ICASSF! A h t o, 2777-780,1996-.*

M. A. Zissman and K. M. Berkling, "Automatic language identification," Speech Commun., vol. 35, pp. 115-124, 2001.*

M. Clements, S. Robertson, and M. Miller. Phonetic searching applied to on-line distance learning modules. In Digital Signal Processing Workshop, 2002 and the 2nd Signal Processing Education Workshop. Proceedings of 2002 IEEE 10th, pp. 186-191, 2002.*

Stefan Besling. A Statistical Approach to Multilingual Phonetic Transcription. Philips Journal of Research, 1995.*

G. J. F. Jones, J. T. Foote, K. Sparck Jones, and S. J. Young. Retrieving spoken documents by combining multiple index sources. In Proceedings of ACM SIGIR'96, pp. 30-38, 1996.*

Frank Seide, Peng Yu, Chengyuan Ma, and Eric Chang. Vocabulary-Independent Search in Spontaneous Speech. 2004. IEEE.*

Muthusamy Y.K., Barnard E. & Cole R.A., (1994) "Reviewing Automatic Language Identification", IEEE Signal Processing Magazine, vol. 11, No. 4, pp. 33-41.

PhD of Martin Wechsler, "Spoken Document Retrieval based on Phoneme Recognition", 1998.

D.A. James & S.J. Young "A fast Lattice-Based Approach to Vocabulary Independent Word Spotting", Proc. ICASSP, 1994.

Roy Wallace, Robbie Vogt and Sridha Sridharan, "A phonetic Search Approach to the 2006 NIST Spoken Term Detection Evaluation", Interspeech 2007.

National institute of standard and technology, "Spoken term detection evaluation web site", Dec. 2006. http://www.nist.gov/speech/tests/std/.

Xuedong Huang, Alex Acero and Hsiao-Wuen Hon "Spoken Language Processing: a Guide to Theory, Algorithm, and System Development", Prentice Hall, pp. 4-5, 415-417, 545-547, 558-561,Published: Apr. 25, 2001.

S. Young, "Large Vocabulary Continuous Speech Recognition." IEEE Signal Processing Magazine 13(5): 45-57, Apr. 8, 1996.

Franciska De Jong, Douglas Oard, Roeland Ordelman, Stephan Raaijmakers "Searching Spontaneous Conversational Speech" held in conjunction with the 30th Annual International ACM SIGIR Conference, Jul. 27, 2007, Amsterdam.

Frédéric Bimbot, Jean-François Bonastre, Corinne Fredouille, Guillaume Gravier, Ivan Magrin-Chagnolleau, Sylvain Meignier, Teva Merlin, Javier Ortega-García, Dijana Petrovska-Delacrétaz, and Douglas A. Reynolds "A Tutorial on Text-Independent Speaker Verification" EURASIP Journal on Applied Signal Processing, vol. 2004 (2004), Issue 4, Dec. 2, 2002, pp. 430-451.

Reynolds, D.A.; Rose, R.C. "Robust text-independent speaker identification using Gaussianmixture speaker models" vol. 3, Issue 1, Jan. 1995 pp. 72-83.

* cited by examiner

FIG. 1

PRIOR ART

FIG. 2

PRIOR ART

SYSTEM AND METHOD FOR IMPROVING THE ACCURACY OF AUDIO SEARCHING

CROSS-REFERENCE TO RELATED APPLICATIONS

The present application claims the benefit under 35 U.S.C. §119(e) of U.S. Provisional Application Ser. No. 60/592,125 filed Jul. 30, 2004, the contents of which is hereby incorporated by reference in its entirety.

COPYRIGHT AND LEGAL NOTICES

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to a system and method for improving the accuracy of audio searches. More specifically the present invention relates to employing a plurality of acoustic and language models to improve the accuracy of audio searches.

Call recording or telephone recording systems have existed for many years storing audio recordings in a digital file or format. Typically, these recording systems rely upon individuals, typically using telephone networks, to record or leave messages with a computerized recording device, such as a residential voice mail system. However, as the technology of conference calls, customer service, and other telephone systems has advanced, call recording systems are now employed on a variety of systems ranging from residential and commercial voice mail to custom service to emergency (911). These recording systems are often implemented in environments where the recorded calls include speakers of many languages, dialects and accents.

As the use of call recording systems has expanded, the database of recorded calls has also expanded. For many call recording systems, such as emergency (911) calls, a database of emergency calls must be maintained for activities such as retrieving evidence or training purposes. Over time, these databases can become quite large, storing enormous amounts of data and audio files from typically numerous and unknown callers. Although calls may be identified by recorder ID, channel number, duration, time, and date in the database, the content of the audio file may be unknown without listening to the call records individually. However, the content of audio files in a call recording database is often of particular interest for research, training, or evidence gathering. Unfortunately, searching audio files for keywords or content subjects is difficult and extremely time consuming unless the searching is performed using automatic speech recognition technology. Traditional systems for searching audio files convert audio files in a database into a searchable format using an automatic speech recognition system. The speech recognition system employs a single model, representing a language such as English, to perform the conversion. Once a searchable format of the database is created, the database is searched for keywords or subject matter and the searching system returns a set of search results called hits. The search results indicate the location, along with other possible information, of each hit in the database such that each hit may be located and heard. The search results may also indicate or flag each audio file in the database containing at least one hit.

Unfortunately, typical systems manage to identify only a small portion of this audio information. This is because of the formidable task of using speech recognition technology to recognize the wide variety of pronunciations, accents, and speech characteristics of native and non-native speakers of a particular language or multiple languages. Keywords are often missed in searching because audio files are not accurately converted by the automatic speech recognition system or indexing engine. Therefore, due to the large number of unknown voices on a call recording system and the different pronunciations, accents, speech characteristics, and languages possible in any given audio file in a call recording database, traditional searching techniques have failed to provide less than optimal search results.

SUMMARY OF THE INVENTION

The present invention includes systems and methods for improving audio searching using multiple models and combining multiple search resulting into a unified search result.

In one embodiment, the present invention may gather an audio stream and determine a plurality of models for use in processing the audio stream based upon the plurality of models to obtain a plurality of search tracks. This may further include collecting at least one search term and processing the plurality of search tracks to find at least one search term to obtain a plurality of search results. Each of the plurality of search results may correspond to one of the plurality of models. Finally, the search results may be combined into a unified search result.

In one embodiment of the invention, each of the plurality of models may include an acoustic model and a language model. Also, each of the plurality of models may cover a different language or at least one of the plurality of models covers a dialect or an accent. Further, each of the plurality of search results may include at least one hit, where a hit includes an offset and a confidence score.

In yet another embodiment, the method of combining the search results may include clustering hits from the plurality of search results according to offsets and determining a resultant confidence score for each cluster of hits.

In determining the resultant confidence score, an embodiment of the present invention may compute the resultant confidence score using a simple average or a weighted average. The resultant confidence score may also be computed using a maximal confidence or a non-linear complex rule.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

The present disclosure will now be described more fully with reference to the Figures in which certain embodiments of the present invention are illustrated. The subject matter of this disclosure may, however, be embodied in different forms and should not be construed as being limited to the embodiments set forth herein.

Figure 1:
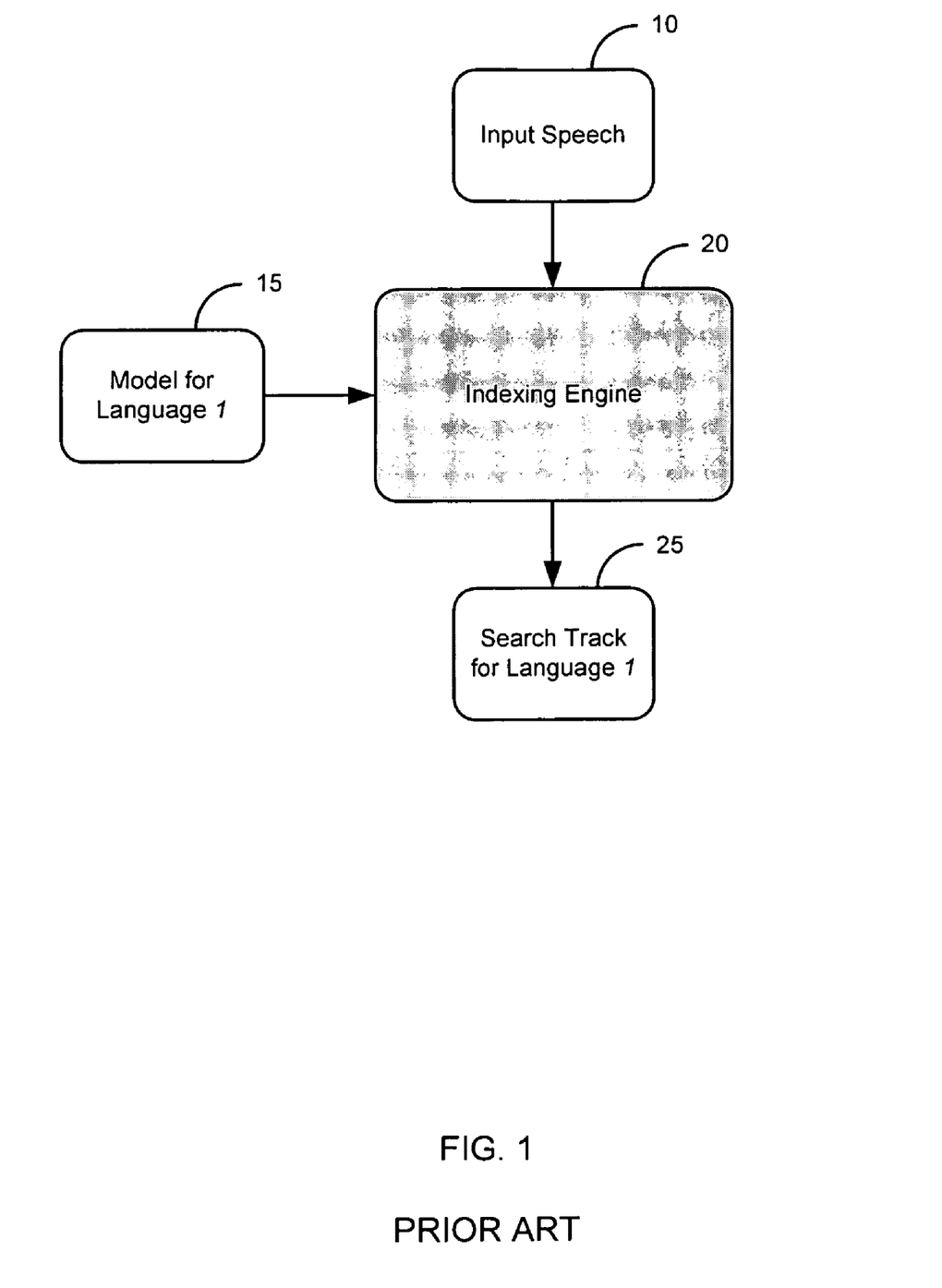
FIG. 1 shows a logic flow diagram of prior art monolingual indexing, according to one embodiment of the present invention.
Figure 2:
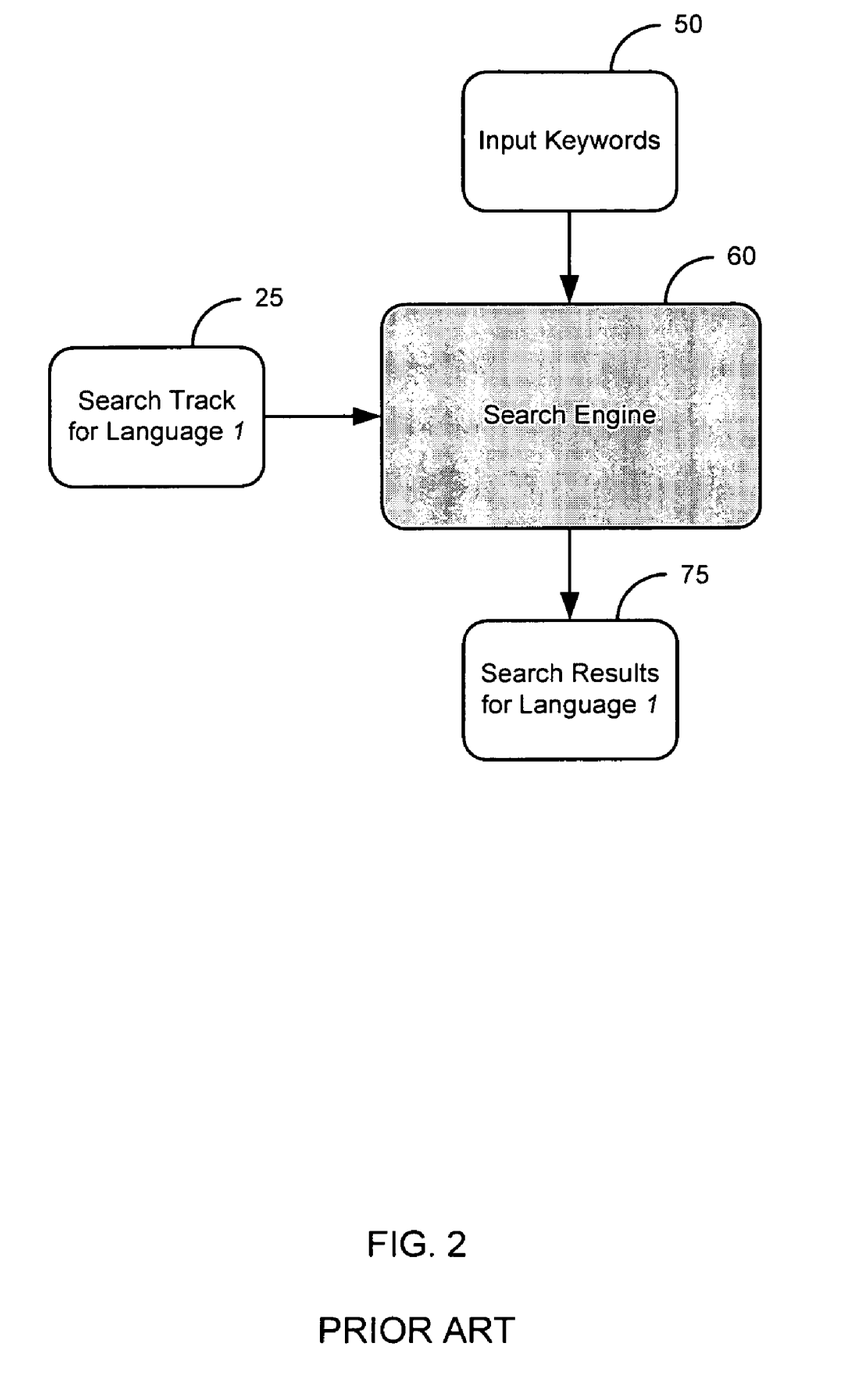
FIG. 2 shows a logic flow diagram of prior art monolingual searching, according to one embodiment of the present invention.

A conventional searching system used to retrieve particular call records of interest is shown as prior art in FIGS. 1 and 2. In FIG. 1, the input speech 10 or audio files in the database are processed by the indexing engine 20 to produce the search track 25. The indexing engine 20 processes the input speech 10 using model 15 for a specific language. The model 15 may include both the acoustic model and the language model used in most automatic speech recognition systems. The search track 25 includes a sequence of words or phonemes to be searched for keywords.

In FIG. 2, the search track 25 is processed by a search engine 60 to find the keywords 50. A search result 75 is produced and typically indicates whether the keywords 50 were found in the search track 25. When a keyword is matched to a word in the search track, the search engine 60 includes a hit in the search results 75, which typically includes the keyword, the offset (the location in the audio file), and a confidence measure of the match. The search results 75 that have a threshold confidence measure for keyword hits are returned as results of the search. If the confidence measure does not meet the threshold, the hit is not returned in the search results 75.

Figure 3:
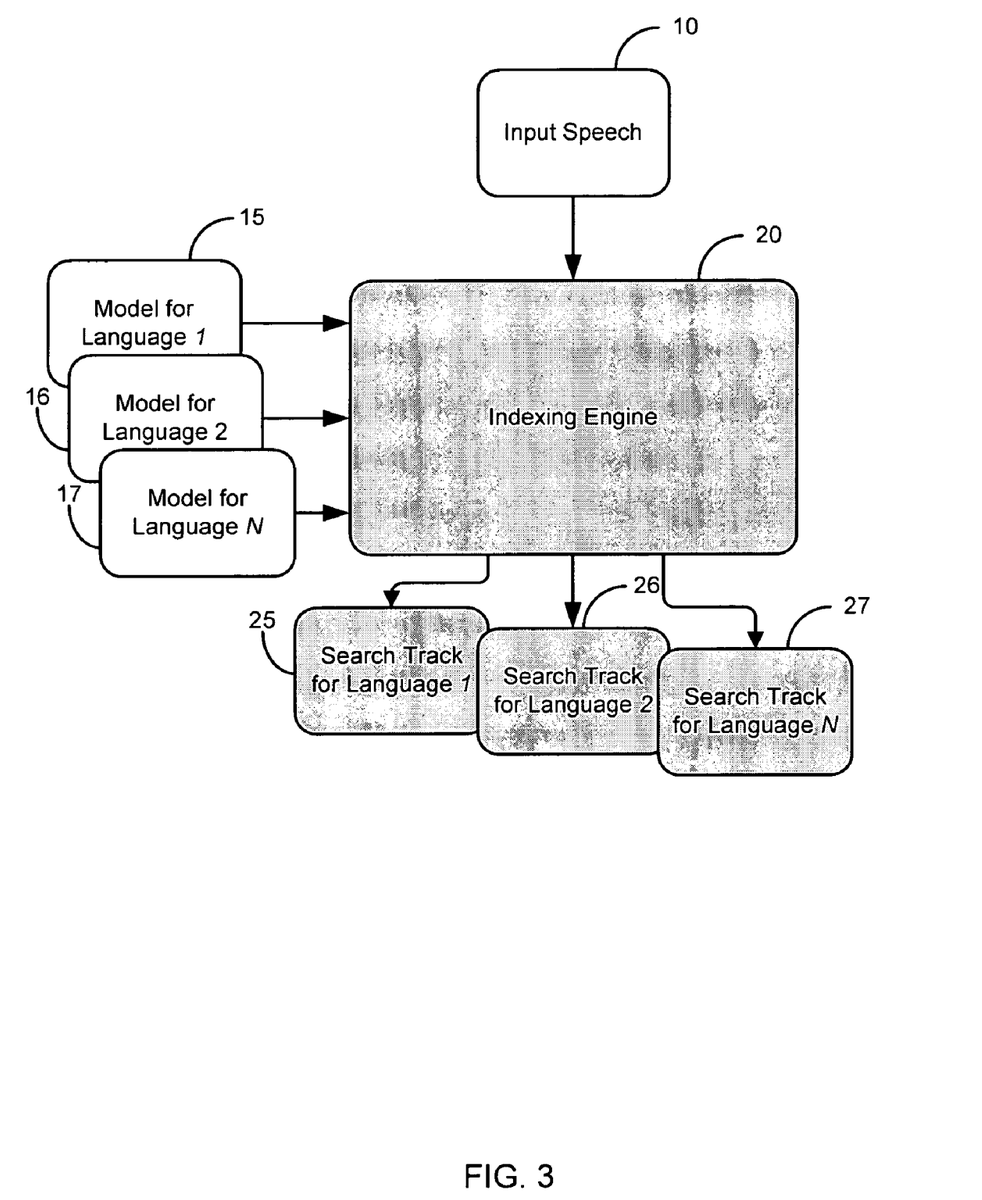
FIG. 3 shows a logic flow diagram of a multilingual indexing system and method, according to one embodiment of the present invention.

Referring now to FIG. 3, a logic flow diagram according to one embodiment of the present invention is shown. An indexing engine 20 is shown receiving audio signals or input speech 10 as well as models 15, 16 and 17 for languages 1, 2, through N. Indexing engine 20 may be an automatic speech recognition system processing input speech 10 with each of the models 15, 16 and 17 to create search tracks 25, 26 and 27. Indexing engine 20 may process input speech 10 with models 15, 16 and 17 in serial or in parallel to create search tracks 25, 26 and 27. Thus, in the present invention, indexing engine 20 may process input speech 10 with each of the models 15, 16 and 17. For example, as shown in FIG. 3, indexing engine 20 may process input speech 10 three times (assuming N is 3), one time for each model 15, 16, 17. It is important to note, however, that the value of N may be more or less than 3 and the present invention may employ more or less models than those shown in FIG. 3.

Input speech 10 may include one or more audio files and may also include various forms of audio formats, including digital formats such as .wav, mp3, mpeg, mpg, .avi, .asf, .pcm, etc. Search tracks 25, 26 and 27 may also take the form of various formats such as a sequence of words or a sequence of phonemes. Search tracks 25, 26 and 27, generated by the indexing engine 20, may include automatic speech recognition output in the form of a sequence of words or phonemes that correspond to the input speech 10. It is also contemplated, however, that search tracks 25, 26 and 27 may also be represented in other searchable digital formats.

Models 15, 16 and 17 may include the input necessary for automatic speech recognition to create search tracks 25, 26 and 27. In other words, these models may serve as the drivers for processing the input speech 10. The typical input to an automatic speech recognition system may include two elements: an acoustic model and a language model. For example, if model 15 is for the English language, then model 15 may include an acoustic model for English and a language model for English. Further, models 15, 16 and 17 may include the acoustic model and the language model or may include other inputs such that the indexing engine 20 may process the input speech 10 to create search tracks 25, 26 and 27.

In FIG. 3, models 15, 16, and 17 represent inputs into the indexing engine 20 for languages 1, 2, through N respectively. Therefore, in FIG. 3, the input speech 10 may be processed by indexing engine 20 to create search track 25 according to model 15 and language 1, search track 26 according to model 16 and language 2, and search track 27 according to model 17 and language N. The languages as shown in FIG. 3 and as discussed in this specification may literally represent different languages. For example, English, French, and Arabic may be the three languages of models 15, 16 and 17 in FIG. 3. However, models 15, 16 and 17 may also include accent models, dialect models, individual speaker models, and gender based models.

Figure 4:
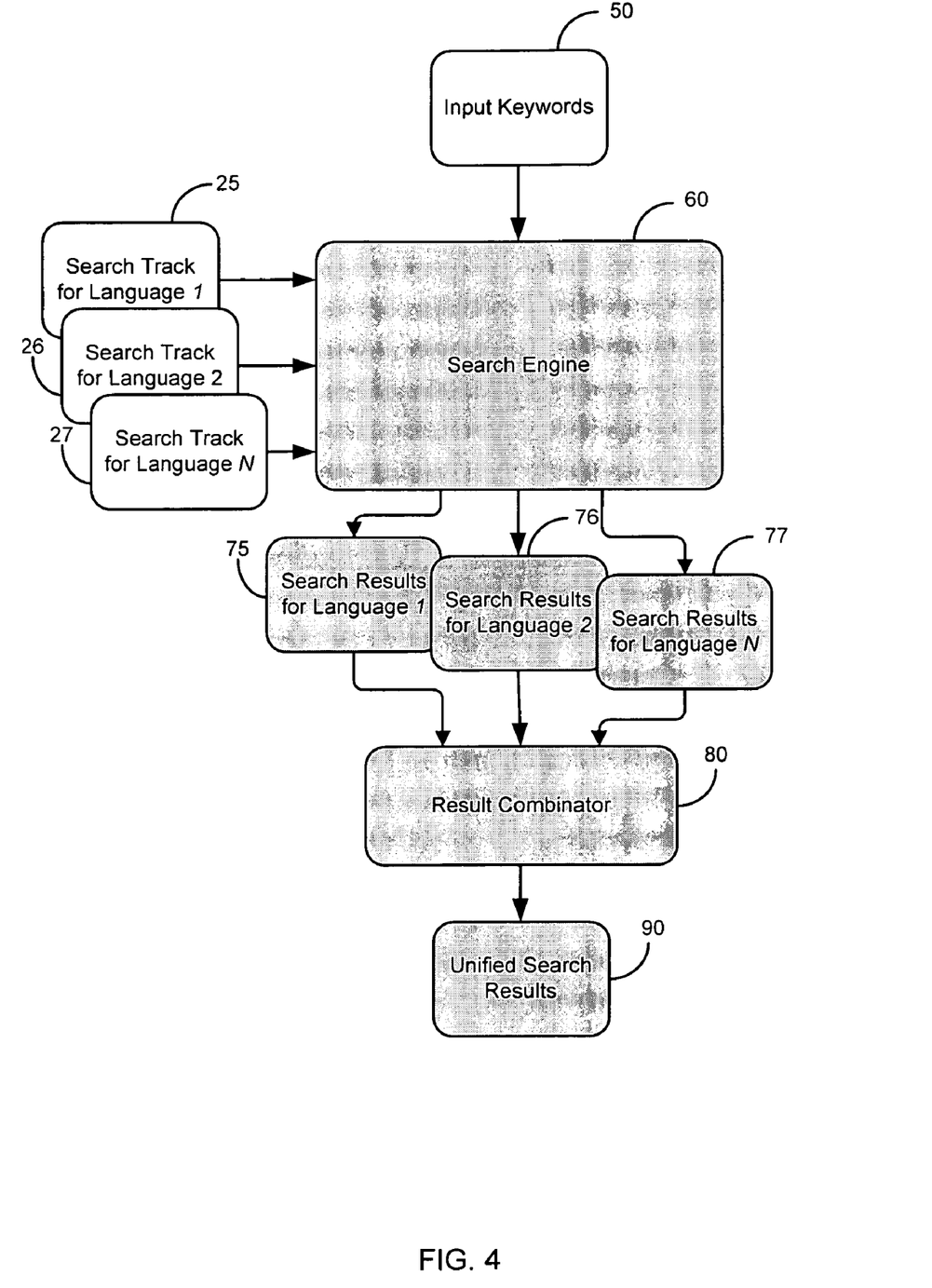
FIG. 4 shows a logic flow diagram of a multilingual searching system and method, according to one embodiment of the present invention.

Referring now to FIG. 4, a logic flow diagram according to one embodiment of the present invention is shown. A search engine 60 is shown receiving inputs from input keywords 50 and the search tracks 25, 26 and 27 (from FIG. 3). Input keywords 50 include the key search terms or targets that the system is attempting to identify in the content of the audio file or input speech 10. The input keywords 50 may be entered into the search engine 60 as words or as phonemes and may include any suitable input including a single word or character to a entire phrase. It is contemplated that the format of the input keywords 50 may match the format of the search tracks 25, 26 and 27 to aid in searching the search tracks 25, 26 and 27 for the input keywords 50. However, the input keywords 50 may be entered into the search engine 60 in any desired format so long as the search engine 60 may identify the input keywords 50 in the search tracks 25, 26 and 27.

A phonetic dictionary may be used to convert the input keywords 50 into phonemes to be used by the search engine 60. If a keyword is not in the phonetic dictionary, then the phonetic dictionary may guess the phonetic spelling of a keyword, According to a set of rules specific to the language of the phonetic dictionary. It is contemplated that language specific phonetic dictionaries may be used to generate phonetic targets to be compared to the language specific search tracks. For example, assuming model 15 is an English model and search track 25 includes the sequence of phonemes resulting from the indexing engine 20 using model 15 on the input speech 10, an English phonetic dictionary would be used to generate an English phonetic target to search for matches on search track 25. Further, assuming model 16 were a French model, a French phonetic dictionary would be used to generate a French phonetic target for search track 26. It is also contemplated, however, that a single phonetic target may be applied to each of the search tracks regardless of the language of the models used to generate the search tracks. Moreover, it is also contemplated that phonetic targets may be generated for each language represented by the models and each phonetic target then applied to each of the search track generated by the indexing engine 20.

Search engine line 60 searches the search tracks 25, 26 and 27 for the input keywords 50 and creates search results 75, 76 and 77. Again, it is contemplated in the present invention that search engine 60 will conduct the same or similar search on each of the search tracks 25, 26 and 27 and create a search result for each model input into the indexing engine 20 shown in FIG. 3. It should be noted that search engine 60 may perform searches on the search tracks 25, 26 and 27 in parallel or in series depending on the software, capabilities of the search engine 60, and a desired output. Therefore, as opposed to the single model 15, single search track 25, and single search result 75 as shown in FIGS. 1 and 2, the embodiment of the present invention, as shown in FIGS. 3 and 4, generates multiple search tracks and multiple search results; the number of search results or each input speech 10 being equivalent to the number of models coupled to the indexing engine 20.

In searching the search tracks 25, 26, and 27, search engine 60 may attempt to match the patterns of words or phonemes in the input keywords 50 to same or similar patterns of words or phonemes in the search tracks 25, 26 and 27. However an exact match is not necessary and the search engine 60 may utilize a fuzzy match or other matching technique known to those skilled in the art. This allows matches or partial matches to be determined. In some embodiments, the user may select the desired level of match precision. Each match may be given a confidence score or value by the search engine 60. For example, an exact match may receive a confidence score of 100%. However, if the match is not exact, then some lower percentage may be assigned to the match representing the degree to which the pattern of a keyword matches a pattern in a search track. A threshold value may be assigned such that confidence measures for fuzzy matches above a predetermined value may be considered a hit and confidence measures for fuzzy matches below the predetermined value may be discarded.

Therefore, each of search results 75, 76 and 77 may be a collection of hits collection or instances where search engine 60 matched words or phonemes of the input keywords 50 to words or phonemes somewhere along the search tracks 25, 26 and 27. As mentioned above, each of these hits or instances may be annotated with a confidence value. Therefore, the search engine 60 may generate a search result, a collection of hits, for each model coupled to indexing engine 20.

Figure 5:
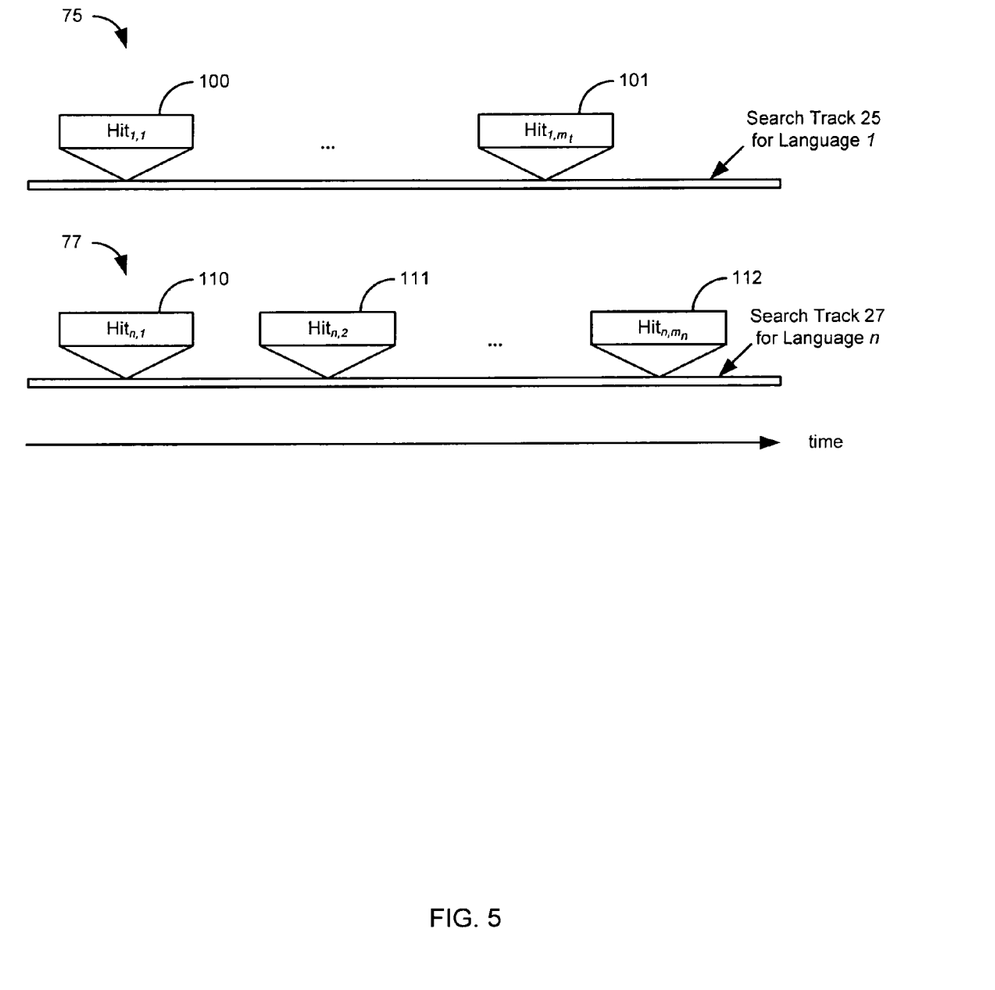
FIG. 5 shows a timeline of multiple search results of a multilingual searching system and method, according to one embodiment of the present invention.

Referring to FIG. 5, a timeline of search results 75 and 77 are shown. Search track 25 is displayed above the search track 27 with the passage of time indicated by the arrow at the bottom of the figure. As shown in FIGS. 3 and 4, search track 25 and search result 75 corresponds to language 1 and search track 27 and search result 77 corresponds to language N. Starting on the left, the search engine 60 locates hit 100 and hit 101 on search track 25. Likewise, search engine 60 locates hit 110, 111, and 112 on search track 27. It is important to note that hit 101 is located when indexing engine 20 and search engine 60 apply model 15 with language 1. Further, hit 111 and hit 112 are located when indexing engine 20 and search engine 60 apply model 17 with language N. However, both hits 100 and 110 are located by both models 15 and 17. Therefore, using FIG. 5 as an example, search result 75 would consist of hits 100 and 101 and search result 77 would consist of hits 110, 111 and 112.

A hit may include a single instance in the search track where a keyword is located. However, a hit may also include a small bundle of information containing a keyword or keywords. If input keywords 50 are single words to be found in the search track, then the hit may include only information regarding the match in the search track. However, input keywords 50 and search terms are typically phrases of words or Boolean searches such that a hit includes a bundle of information on the matching phrase or group of words or phonetics in the search track.

Each hit may be considered a tuple (information bundle) and may include annotations to identify the hit. As shown in FIG. 5, hit 100 may be annotated with a search track index of (1,1) as a hit on the first track according to language 1 and the first hit in time on the search track 25. Likewise, hit 112 may be annotated with a search track index of (N, M) as a hit on the N track according to language N and the last hit (numbered M) in time on the search track 27. Each hit may also be recorded in the search results 75, 76 and 77 as including a search track index, keyword, offset, and confidence value. The offset may indicate the time from the beginning of the search track to the beginning of the keyword. It is contemplated that the hit may also include additional information such as the phonetic sequence of target keyword, the actual phonetic sequence found, and the duration of the keyword (or, alternatively, the offset from the beginning of the search track to the end of the keyword). An example of the information describing hit 100 is depicted in the table below:

| | |
|---|---|
| Search track index | 1,1 |
| Keyword | emergency |
| Offset | 12.73 seconds |
| Confidence | 87% |
| Target phonetic sequence | IH M ER JH AH N S IY |
| Actual phonetic sequence | IY M ER JH AH N S IY |
| Duration | 0.74 seconds |

In the example of the table above, the search track index indicates that hit 100 is on the first search track 25 created by indexing engine 20 using model 15 and language 1. The input keyword 50 in the example is "emergency" and a target phonetic sequence is shown. The search engine 60 may use the target phonetic sequence to attempt to locate matches in search track 25. In the example above, a match was located in search track 25 with an offset of 12.73 seconds, a duration of 0.74 seconds, and an actual phonetic sequence as shown. The similarity between the target phonetic sequence and the actual phonetic sequence in search track 25 generates a confidence value of 87%. The information described in the table above may be included in the search results 75, 76 and 77 for each hit located in the search tracks 25, 26 and 27 with a confidence value above a certain threshold.

It is important to note that the phonetic sequence of each search track may vary as a result of being processed by indexing engine 20 by different models and different languages. This variation in phonetic sequences between search tracks 25, 26 and 27 may result in different search results, as seen in FIG. 5. As discussed above, different target phonetic sequences corresponding to input keywords 50 may be generated using different phonetic dictionaries. These different target phonetic sequences may also contribute to different search results when target phonetics are matched to the actual phonetics in the search track.

Looking back to FIG. 4, a result combinator 80 may combine the search results 75, 76 and 77 and all the hits contained therein to form a unified search result 90, a single set of hits for each input speech 10 or each entry in a call recording database. The task of the result combinator may include, for each input speech 10 and input keywords 50, taking the hit sets for each search track into consideration and produce a unified, possibly reduced, hit set. Thus, the different results from the different languages, dialects, and accents are combined to create the unified search result 90, which is more accurate than the single search result 75 as shown in FIG. 2.

The result combinator 80 may combine search results 75, 76 and 77 in two steps: grouping the hits into clusters and computing a single hit from each cluster. The first step may also include grouping hits into clusters includes establishing which hits, in the different search tracks, are duplicates of each other. Duplicate hits may be determined by comparing the hit offsets and grouping those hits from different search results 75, 76 and 77 that begin at the same time, within a predetermined threshold, in the input speech 10. For example, if the difference between the hit offsets for hit 100 and hit 110 in FIG. 5 is less than the predetermined threshold, then hits 100 and 110 may be grouped into a cluster and considered duplicates. In other words, the hits are clustered into sets of hits whose offsets differ by less than a predetermined threshold 0, such as 0.1 seconds. The following is an example of an algorithm capable of grouping the hits according to their offsets:

In other words, the search results from a model using English may be weighted more than the search results from a model using a different language. To account for the importance of certain languages, a weight average may be used to determine the computed confidence value of a representative hit. The following formula may be applied to each cluster to determine an average confidence value weighted by language or dialect: (Alternatively, any other suitable method may be used if desired.)

(1)

$$f(c = \langle h_1, \ldots, h_m \rangle) = \frac{\sum_{i=1}^{n} \lambda_i \cdot \text{conf}(c, i)}{N}$$

```
1. C := { }                                    Define C as an empty set of clusters
2. For each hit h                              Place each hit in a cluster of its own
    a.    c := <h>
    b.    C := C u c
3. Do
    a.    N := ICI                             Remember cardinality of
    b.    For each cluster p in C              Compare all pairs of clusters and merge
      i.  For each cluster q in C \ p          them if their offset differs by less than 8
          1. if I p[0].offset − q[0].offset 1 < 0
             then p := sort_by_offset( p u q)
4. Until N = ICI                               Stop when no change in cardinality of C
```

As a result of the above algorithm, result combinator 80 may generate a set of clusters such that each cluster contains one or more hits. It is possible that hits may have offsets that differ less than the predetermined threshold but still get grouped into separate clusters. This may occur when the offsets are sufficiently close but the confidence values and the keywords identified are sufficiently different. The difference in the keywords forces the result combinator 80 to treat the two hits as separate clusters and reported in the unified search result 90 as two hits.

The second step may include transforming the set of clusters into a single set of representative hits. Each cluster may be reduced to a representative hit by combining the one or more hits in each cluster. This reduction may be achieved by determining a computed confidence value for each representative hit based on a combination of the confidence values from each hit in a cluster. Determining the computed confidence value of the representative hit may be achieved in a variety of ways.

In one embodiment of the present invention, the confidence values of the hits in a cluster may be combined in the result combinator 80 using a linear combination, including but not limited to a simple average combination and a weighted average combination. The simple average may use a linear function to determine a computed confidence value equivalent to the average of the confidence values from hits belonging to the same cluster. This method treats the hits generated in the search results 75, 76 and 77 in substantially the same way and combines the results of each different language or dialect with equal weight.

The weighted average may use a linear function to determine a computed confidence value with a weight applied to search results associated with specific languages or dialects.

where

N is the number of search tracks $c = \langle h_1, \ldots h_m \rangle$ is a tuple of the m hits (m≦N) belonging to cluster c conf(c, i) is a function that returns either the confidence of the hit in cluster c for search track i, if present, or 0 otherwise $0 < \lambda_i < 1$, $1 \leq i \leq N$ are the relative weights of each language or dialect Note that simple (uniformly weighted) average, may be accomplished by setting $\lambda_i = 1/N$, for all $1 < i < N$ In another embodiment of the present invention, the confidence values of the hits belonging to a cluster may be combined in result combinator 80 using a non-linear combination, including but not limited to a maximal confidence and a complex rule computation. The maximal confidence may determine a computed confidence value for a representative hit from the maximum confidence value of any of the hits in a cluster. The maximal confidence of each cluster may be determined from the following formula:

$$f(c = \langle h_1, \ldots h_m \rangle) = \max(c) \tag{2}$$

where $C = \langle h_1, \ldots, h_m \rangle$ is a tuple of the m hits (m N) belonging to cluster c max(c) is a function that returns the maximum of the confidence values of all the hits in c Arbitrarily complex rules may also be applied on a cluster of hits to determine a computed confidence value of a representative hit. The complex rules may take on a variety of forms and may generate confidence values for representative hits according to a predetermined rule set. For example, given the search tracks:

| Search track index | Language or dialect |
|---|---|
| 1 | U.S. English |
| 2 | U.K. English |
| 3 | Standard Portuguese |
| 4 | Brazilian Portuguese |

A complex rule can be:

| For each cluster c | |
|---|---|
| If hit present for search tracks 1 and 2 | then return 99% |
| Else if hit present for search track 1 but not for search track 2 | then return 50% |
| Else if hit present for search track 2 but not for search track 1 | then return 40% |
| Else | return 0% |

Another embodiment for determining the complex rules and confidence values may include identifying in advance the language of an audio file and assigning a specific confidence value if the keywords are found in the search track for the language. For example, if a conversation is in English, then a higher weight may be assigned to the English model or more specifically to some particular model using a particular dialect of English. Further, if it is determined that some foreign words are being used in the conversation, then a higher weight may be assigned to the foreign language models. In this example, foreign words for place names, people's names and other such foreign words may actually be recognized and identified by the search engine. In such a situation, models using foreign languages may need additional weight such that hits from foreign models are given appropriate weight by the result combinator 80.

The determination of a computed confidence value for a representative hit may be found using any of the above mentioned linear and non-linear combination as well as any combination of different computational techniques. It should be noted that representative hits may be filtered out if the computed confidence values fall below a certain threshold.

Figure 6:
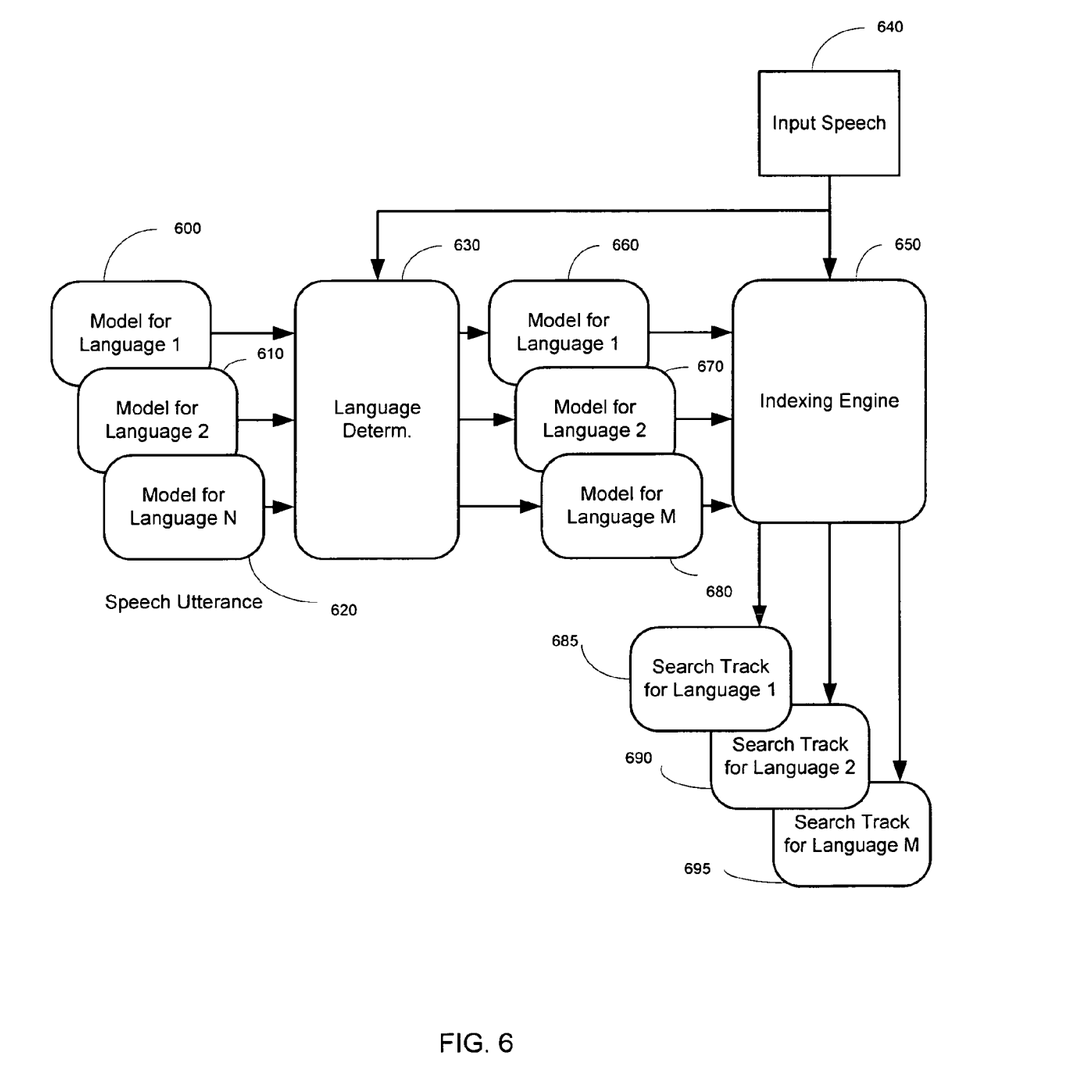
FIG. 6 shows a logic flow diagram of a multilingual indexing system and method with a language determining module, according to one embodiment of the present invention.

Referring to FIG. 6, a logic flow diagram of a multilingual indexing system with language determining module is shown. FIG. 6 may function as described in FIG. 3, with the addition of a module to determine the plurality of models that will be used in the subsequent indexing/search process. The purpose of this module is to reduce the number of active languages from N to M, without sacrificing accuracy.

In FIG. 6, models 600, 610 and 620 represent inputs into the language determining module 630 for languages 1, 2, through N respectively. The language determining module 630 processes models 600, 610 and 620 and reduces the number of active languages to M, that is, models 660, 670 and 680 for languages 1, 2 and M respectively.

Therefore, in FIG. 6, input speech 640 may be processed by indexing engine 650 to create search track 685 according to model 660 and language 1, search track 690 according to model 670 and language 2, and search track 695 according to model 680 and language M. The languages as shown in FIG. 6 and as discussed in this specification may literally represent different languages. For example, English, French, and Arabic may be the three languages of models 600, 610, and 620 in FIG. 6. However, models 600, 610, and 620 may also include accent models, dialect models, individual speaker models, and gender or age based models.

In some cases M could be set to 1 so only one language will be active in the subsequent indexing/search phases. The active language/model may be chosen according to the speech input. The active language will be the most likely language to present the speech utterance spoken language.

Figure 7:
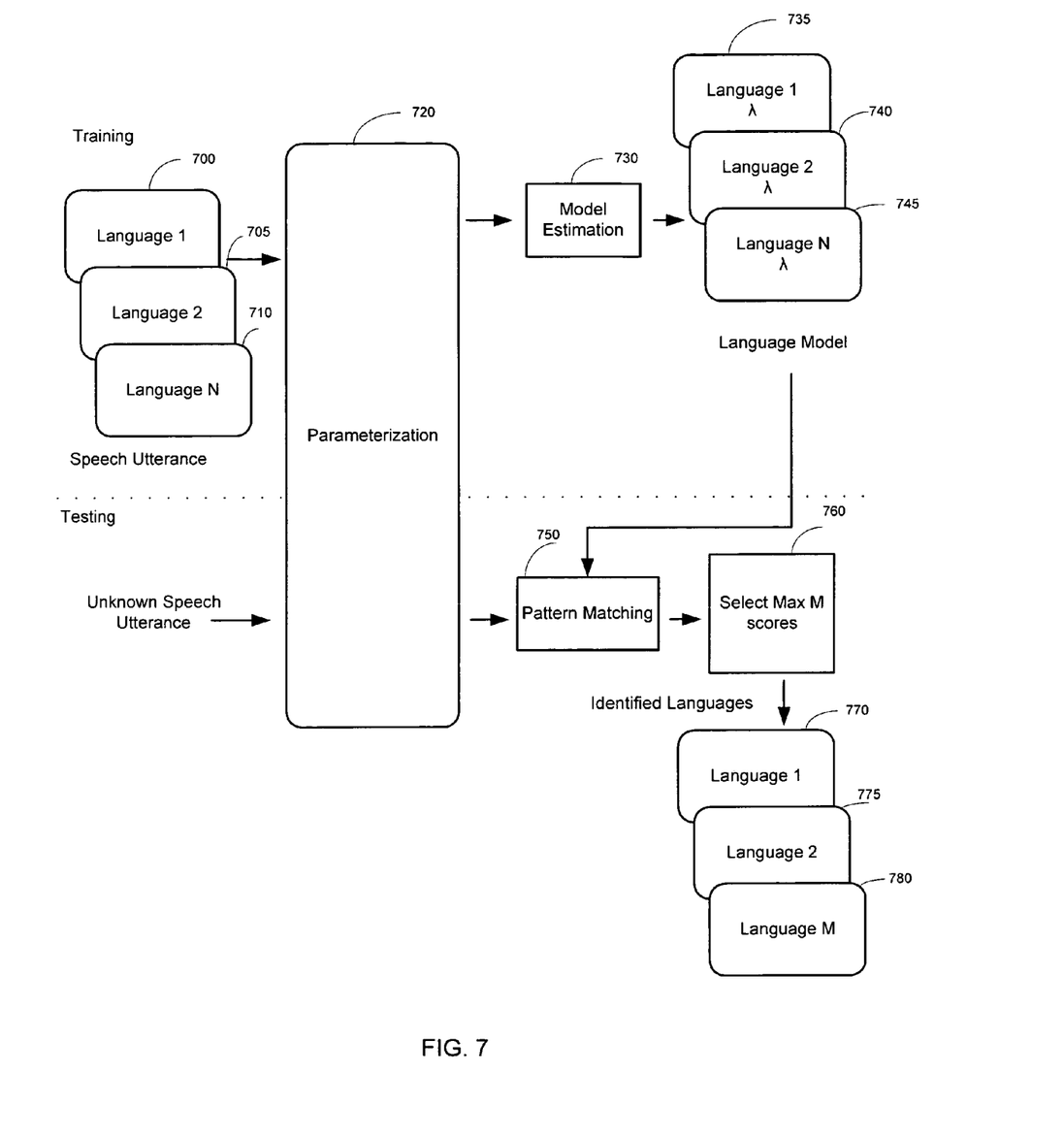
FIG. 7 shows a logic flow diagram of a language determining module, according to one embodiment of the present invention.

Referring to FIG. 7, a logic flow diagram of a language module to determine which are the most likely languages to present an unknown speech utterance language is shown. The module may discuss training and testing stages.

The training stage may involve the acquisition of all target-language speech samples. Language models 700, 705, and 710 for languages 1, 2, through N respectively are input into the parameterization step 720. In parameterization step 720, the signals may be pre-processed and features may be extracted. One goal is to extract a number of parameters ("features") from the signal that have a maximum of information relevant for the following classification. This may mean that features are extracted that are robust to acoustic variation but sensitive to linguistic content. In other words, features that are discriminant and allow to distinguish between different linguistic units may be employed. On the other hand, the features should also be robust compared to noise and other factors that are irrelevant for the recognition process. Using these sequences of feature vectors, target-language models may be estimated in the model estimation step 730. This model estimation step 730 may generate language models 735, 740 and 745 for languages 1, 2, through N respectively.

In the testing stage, the input is typically an unknown utterance spoken in an unknown language. Again, the input speech may undergo pre-processing and feature extraction in the parameterization step 720. A pattern matching scheme 750 may be used to calculate a probabilistic score, which represents the likelihood that the unknown utterance was spoken in the same language as the speech used to train each model (target-language). Pattern matching 750 may be performed on language models 735, 740 and 745 for languages 1, 2, through N respectively. Various algorithms may be used in pattern matching step 750. After the score has been calculated for each language in step 760, score alignment is made and the top M likely models (in most cases M will be set to 1) are determined as the M identified languages, that is, language models 770, 775, and 780 for languages 1, 2, and M respectively. This module also reduces the number of active languages from N to M, without sacrificing accuracy.

Thus, the accuracy of audio searching is improved by the present invention in a number of ways including improving the recall of the search results without sacrificing precision. The recall of the search results refers to the number of representative hits returned by the system in unified search results. The precision of the search results refers to the ratio or percentage of actual hits to total hits in the search results. For example, if a search returns ten hits with five actual hits and five false-positives, then the recall is ten hits and the precision is 50%. When the present invention is compared to traditional searching systems using a single model, the present invention improves the recall, allowing more hits to be captured in searching an audio database, while maintaining precision.

For example, in testing an audio database by searching for the keyword "emergency", the traditional system using a single English model only returned about 60% of the possible instances of the word in the database. However, the present invention using English and Spanish models returned about 90% of the possible instances of the word "emergency" in the audio database. This is equivalent to about a 50% increase in recall. The ratio of false-positive hits to the total number of hits returned remained the same for the traditional searching system and the present invention.

The present invention outperformed conventional searching when an audio database is searched for person's last names. The present invention, using multiple language models, doubled the number of actual hits while maintaining the ratio of false-positive hits to the total hits in the search results. This indicates that the present invention increases recall by 100% when searching for person's last names.

It will be apparent to one of skill in the art that described herein is a novel system and method for automatically modifying a language model. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. A method for improving the searching of an audio stream with improved accuracy, the method comprising:
   gathering the audio stream carrying voice of an unknown speaker, by a call recording system;
   determining a plurality of acoustic models;
   indexing said audio stream using said plurality of acoustic models to generate a plurality of phonetic search tracks, at least one of the plurality of phonetic search tracks comprising a first sequence of phonemes;
   collecting at least one keyword;
   processing said plurality of phonetic search tracks and said at least one keyword to obtain a plurality of search results by matching a pattern of phonemes in the at least one keyword with a pattern of phonemes in each of said plurality of phonetic search tracks, such that each of said plurality of search results corresponds to one of said plurality of acoustic models, and each of said plurality of search results indicates whether the at least one keyword was found in one of said plurality of search tracks, wherein each of said plurality of search results includes at least one hit indicating detection of the at least one keyword within one of said plurality of phonetic search tracks, the at least one hit having a time offset; and
   combining said plurality of search results into a unified search result~said combining comprising:
      grouping at least two hits having time offsets which differ in at most a predetermined threshold into a cluster; and
      determining a single hit from the cluster as the unified search result, the single hit indicating that the at least one keyword appears in the audio stream; and
   wherein each of said plurality of acoustic models represents a language or dialect.

2. The method according to claim 1, wherein each of said plurality of acoustic models is a phonetic acoustic model.

3. The method according to claim 1, wherein the at least one hit comprises a confidence score.

4. The method according to claim 3, wherein the step of combining said search results further comprises determining a resultant confidence score for cluster.

5. The method according to claim 4, wherein the step of determining a resultant confidence score includes computing a simple average.

6. The method according to claim 4, wherein the step of determining a resultant confidence score includes computing a weighted average.

7. The method according to claim 4, wherein the step of determining a resultant confidence score includes computing a maximal confidence.

8. The method according to claim 4, wherein the step of determining a resultant confidence score includes computing a confidence value with a non-linear rule.

9. The method according to claim 1 wherein each of the plurality of acoustic models represents phonemes.

10. A method for searching an audio streams with improved accuracy, the method comprising:
    gathering the audio stream carrying voice of an unknown speaker, by a call recording system;
    determining a plurality of acoustic models;
    reducing said plurality of acoustic models using a language determining module;
    indexing said audio stream using said plurality of acoustic models to generate a plurality of phonetic search tracks, at least one of the plurality of phonetic search tracks comprising a first sequence of phonemes;
    collecting at least one keyword;
    processing said plurality of phonetic search tracks and said at least one keyword to obtain a plurality of search results by matching a pattern of phonemes in the at least one keyword with a pattern of phonemes in each of said plurality of phonetic search tracks, such that each of said plurality of search results corresponds to one of said plurality of acoustic models, and wherein each of said plurality of search results indicates whether the at least one keyword was found in one of said plurality of phonetic search tracks, wherein each of said plurality of search results includes at least one hit indicating detection of the at least one keyword within one of said plurality of phonetic search tracks, the at least one hit having a time offset, and;
    combining said plurality of search results into a unified search result, said combining comprising:
       grouping hits having time offsets which differ in at most a predetermined threshold into a cluster; and
       determining a single hit from the cluster, the single hit indicating that the at least one keyword appears in the audio stream; and
    wherein each of said plurality of acoustic models represents a language or dialect.

11. The method according to claim 10 further comprising:
    training for estimating the plurality of acoustic models, wherein at least one of the plurality of models is in a target language; and
    testing for determining a probabilistic score that a speech utterance signal is in the target language.

12. The method according to claim 11, wherein said training further comprises:
    inputting a plurality of speech utterance signals corresponding to a plurality of target languages;
    processing said plurality of speech utterance signals to extract feature vectors from said plurality of signals; and
    estimating the plurality of acoustic models from said feature vectors.

13. The method according to claim 11, wherein testing further comprises the steps of:
    inputting the speech utterance signal;
    processing the speech utterance signal to extract feature vectors from said signal; and
    applying a pattern matching technique to the speech utterance signal to calculate a probabilistic score.

14. The method according to claim 13, wherein said pattern matching technique is performed by an algorithm.

15. The method according to claim 13, wherein said probabilistic score represents the likelihood that said speech utterance was spoken in the target language.

16. The method according to claim 10 wherein each of the plurality of acoustic models represents phonemes.

* * * * *